Nov. 8, 1938.  H. KREFFT ET AL  2,135,718
GASEOUS ELECTRIC DISCHARGE LAMP DEVICE
Filed Oct. 14, 1937
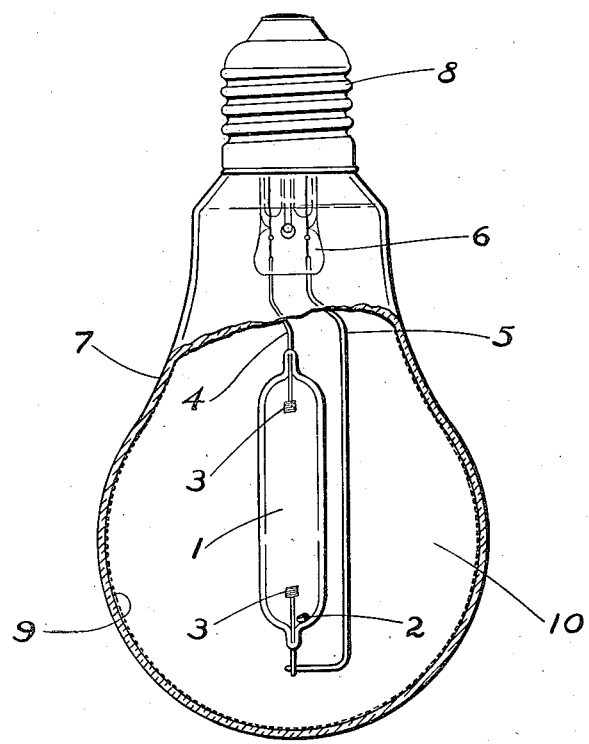
INVENTORS
Hermann Krefft
Alfred Ruttenauer
BY
ATTORNEY Patented Nov. 8, 1938

2,135,718

UNITED STATES PATENT OFFICE 2,135,718

GASEOUS ELECTRIC DISCHARGE LAMP DEVICE

Hermann Krefft, Berlin-Friedrichshagen, and Alfred Rüttenauer, Berlin-Halensee, Germany, assignors to General Electric Company, a corporation of New York Application October 14, 1937, Serial No. 169,052 In Germany October 20, 1936

3 Claims. (Cl. 176—122)

The present invention relates to gaseous electric discharge lamp devices generally and more particularly the invention relates to a lamp device of this type having a luminescent material associated therewith to complement and supplement the visible light emitted by the gaseous electric discharge in the lamp.

Mercury vapor discharge lamps of the type provided with a heat conservator, such as a sealed envelope, to increase the efficiency of the lamp and operating with an elevated container temperature and a high vapor pressure are now known in the art. When lamp devices of this type are provided with a luminescent material which transforms the rays of shorter wave length emitted by the discharge in the lamp, such as the ultra violet rays, into visible rays it is desirable to place the luminescent material on the inner surface of the heat conservator rather than in or on the lamp container to avoid the deleterious effects of the discharge on such material. In such a structure it is, of course, essential that the lamp container consists in whole or in part of a material, such as quartz, capable of transmitting the rays which excite the luminescent material to light emissions. We have observed that in spite of the protection of the luminescent material from the deleterious effects of the gaseous electric discharge in the structure described above the light output of the lamp gradually diminishes.

The object of the present invention is to provide a gaseous electric discharge lamp device of the above type which retains its initial light output and efficiency for a long useful operating life. Still further objects and advantages attaching to the device and to its use and operation will be apparent to those skilled in the art from the following particular description.

We have discovered that the gradual loss in efficiency and light output of the lamp is not due to the discharge lamp per se, but to the luminescent material. We have discovered further that the loss in light output of the luminescent material is caused by the hydrogen and carbon monoxide given off during the operation of the lamp by the walls of the lamp defining the space between the lamp container and the enclosing envelope. These gases are deleterious substances since they react with the luminescent material to cause a diminution in the light output of such material. Having discovered the cause of the difficulty the cure therefor is relatively simple. We accomplish this by introducing into the space between the envelope and the lamp container pure oxygen at a pressure of about 10 to 20 mm. or an oxygen containing gas, such as air, at a pressure of about 50 to 100 mm.

In the drawing accompanying and forming part of this specification an embodiment of the invention is shown in a front elevational, partly sectional view.

Referring to the drawing the gaseous electric discharge lamp device comprises a tubular container 1 consisting of a vitreous material capable of transmitting ultra violet rays and resisting high temperatures, such as quartz. Said container 1 has a starting gas, such as argon, and a quantity of vaporizable material 2, such as mercury, therein. Thermionic, activated electrode 3, comprising a support of high melting point metal, such as tungsten, coated or impregnated with a material having high electron emissivity characteristics, such as a mixture of metallic barium and barium oxide, are sealed into the opposite ends of the container 1. When desired, an auxiliary starting electrode is mounted in the container 1 in the well known manner.

The container 1 is mounted in a sealed vitreous envelope 7, similar to an incandescent lamp bulb, and is supported therein by the current leads 4 and 5 which pass through the stem 6 of said envelope 7. The envelope 7 is provided with a screw base 8 and consists of any of the well known container glasses, such as lead or lime glass. Said container 1 has a coating of luminescent material thereon, such as calcium tungstate, which is applied thereto by methods now known in the art, such as by using a volatilizable binder, such as a mixture of glycerin and amyl acetate. In the manufacture of the lamp the space 10 between the container 1 and the envelope 7 is filled with oxygen or an oxygen containing gas, such as air, at the pressures indicated above.

A lamp having the structure described above is a highly efficient light source which retains its initial efficiency for a long useful operating life.

While we have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention, for example, other types of luminescent material, such as zinc cadmium sulphide, or zinc silicate, may be used as the luminescent material, when desired, and, when desired, the luminescent coating is applied to selected portions of the inner surface of the envelope 7.

What we claim as new and desire to secure by Letters Patent of the United States, is:—

1. A gaseous electric discharge lamp device comprising a container, a gaseous atmosphere therein, electrodes sealed therein and a sealed envelope enclosing said container, said envelope having a coating of luminescent material on the inner surface thereof and having an oxygen containing gas therein at a pressure lower than atmospheric pressure.

2. A gaseous electric discharge lamp device comprising a container, a gaseous atmosphere therein, electrodes sealed therein and a sealed envelope enclosing said container, said envelope having a coating of luminescent material on the inner surface thereof and having an oxygen containing gas therein at a pressure of about 50 to 100 mm.

3. A gaseous electric discharge lamp device comprising a container, a gaseous atmosphere therein, electrodes sealed therein and a sealed envelope enclosing said container, said envelope having a coating of luminescent material on the inner surface thereof and having oxygen therein at a pressure of about 10 to 20 mm.

HERMANN KREFFT.
ALFRED RÜTTENAUER.